W. W. HALE.
ADJUSTABLE SPEED MOTOR.
APPLICATION FILED NOV. 20, 1915.

1,254,902.

Patented Jan. 29, 1918.
3 SHEETS—SHEET 1.

Inventor
Willis W. Hale
by Thurston & Kwis
Attys.

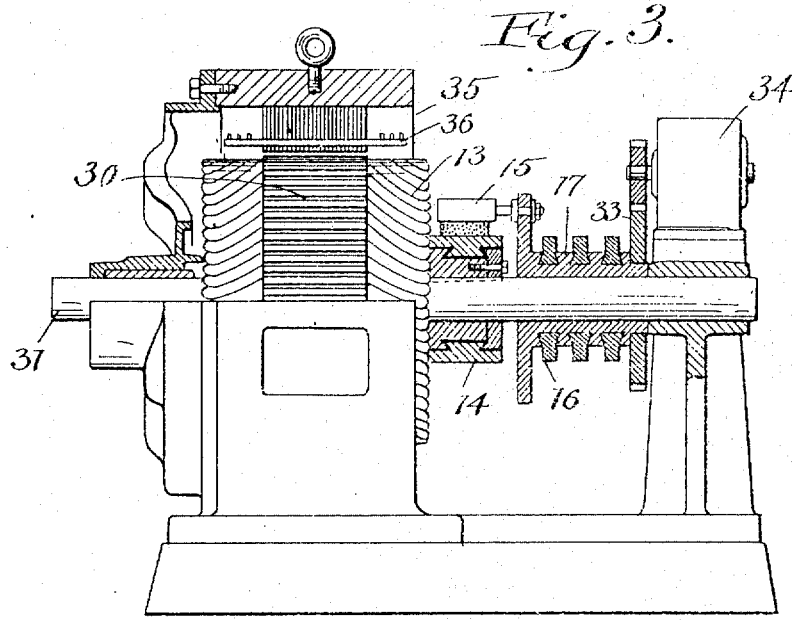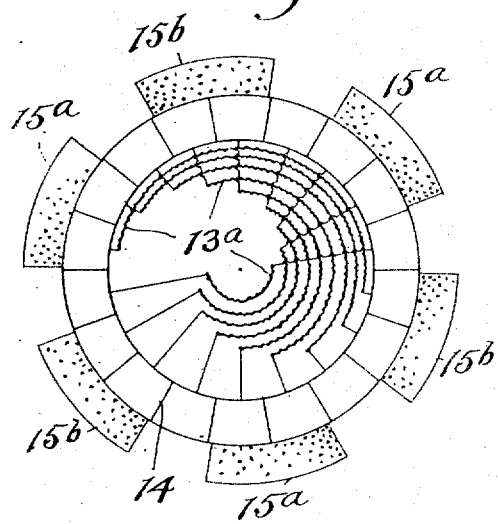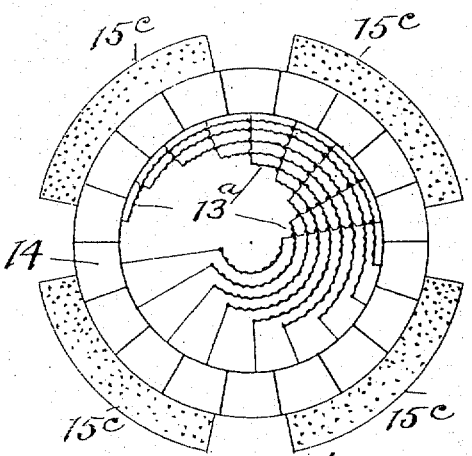

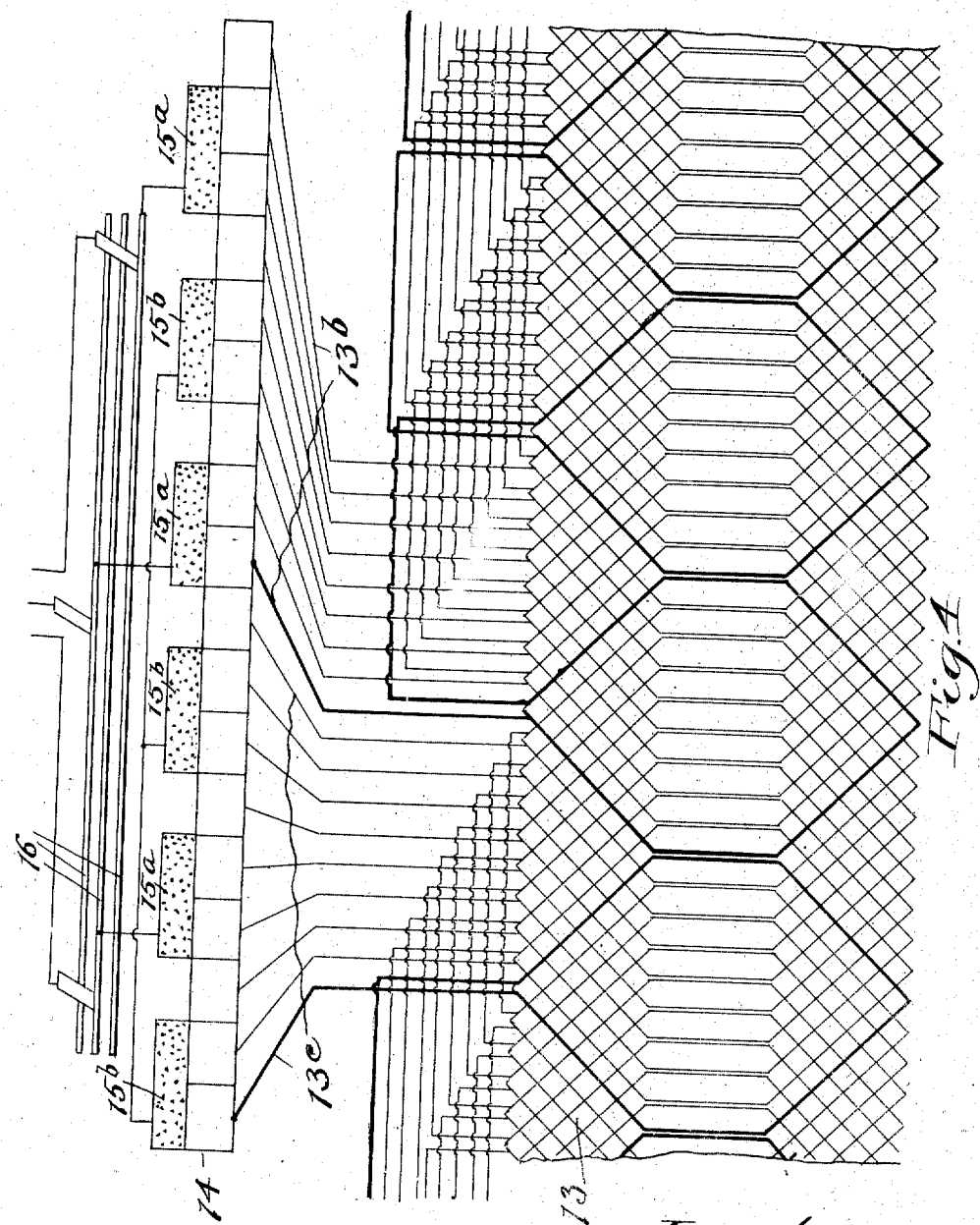

UNITED STATES PATENT OFFICE.

WILLIS W. HALE, OF CLEVELAND, OHIO, ASSIGNOR OF ONE-FOURTH TO NEAL G. GRAY, OF CLEVELAND, OHIO.

ADJUSTABLE-SPEED MOTOR.

1,254,902.  Specification of Letters Patent.  Patented Jan. 29, 1918.

Application filed November 20, 1915. Serial No. 62,472.

*To all whom it may concern:*

Be it known that I, WILLIS W. HALE, a citizen of the United States, residing at Cleveland, in the county of Cuyahoga and State of Ohio, have invented a certain new and useful Improvement in Adjustable-Speed Motors, of which the following is a full, clear, and exact description.

This invention relates to electric motors, and particularly to adjustable speed alternating current motors of the induction type.

One of the objects of the invention is to provide an adjustable speed alternating current motor whose speed can be adjusted through very wide limits and which will have high efficiency regardless of the speed at which it is operated.

A further object is to provide an adjustable speed motor whose speed is controlled without serious or detrimental sparking by rotating brushes engaging a commutator which is connected to the primary or inducing winding.

A still further object is to provide in a motor of the character stated a primary or inducing winding which is so designed and so connected to the commutator that no coil of the winding is shorted either when the brushes are stationary or rotating, and whose connections are suitable for either a direct current or single or polyphase alternating current supply system.

My invention may be briefly summarized as consisting in certain novel details of construction and combinations and arrangements of parts, which will be described in the specification and set forth in the appended claims.

Figure 1:
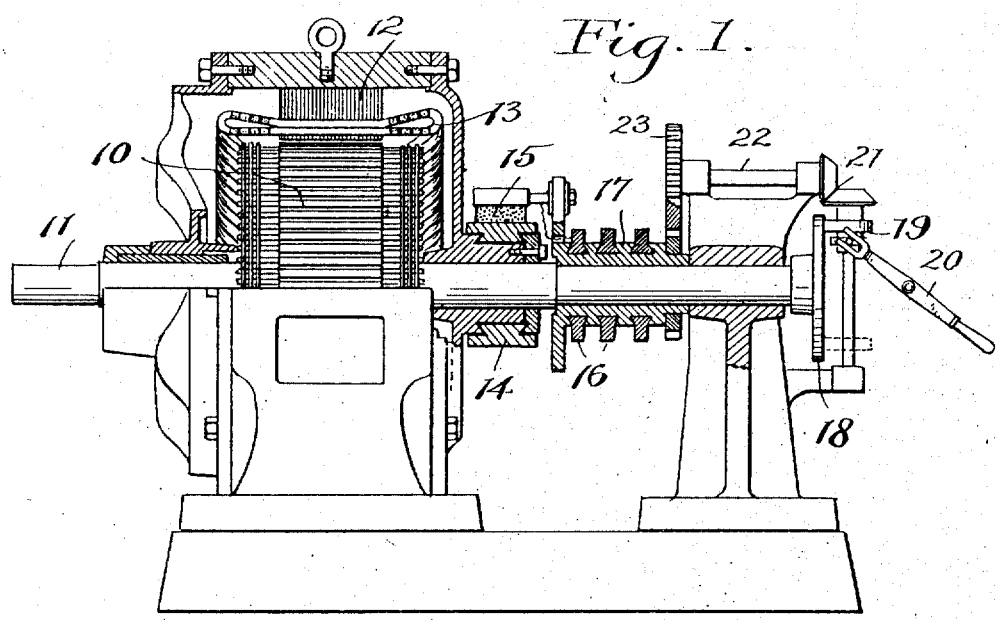
Figure 2:
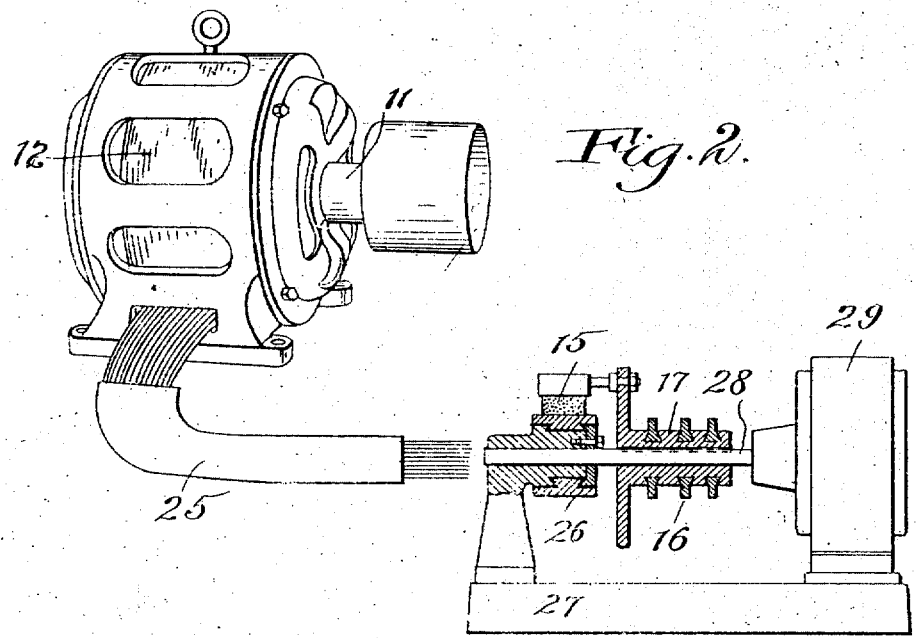

In the accompanying sheets of drawings, Figure 1 is a view partly in side elevation and partly in section, showing an adjustable speed induction motor constructed in accordance with my invention in one of its forms; Fig. 2 is a similar view showing a different way of rotating the brushes; Fig. 3 is a view somewhat similar to Fig. 1, showing a modification in the form of the motor, and a further modification in the manner of rotating the brushes; Fig. 4 is a diagram illustrating the preferred type and design of primary winding which receives current from the source, whether the same be single or polyphase alternating current or direct current, and which may be incorporated in the stator or rotor of a motor of the induction type or synchronous type; Fig. 5 is a further diagrammatic view illustrating particularly the relation between the commutator brushes and component parts of the winding for a three-phase alternating current supply system; and Fig. 6 is a similar view showing the same parts adapted to be employed with a two-phase alternating current supply system.

My invention is particularly applicable and has special utility in induction motors, which, by my invention, are made adjustable in speed. However, my invention may be utilized to advantage with the synchronous type of motor, but as its chief utility is in connection with induction motors I have illustrated motors of that type. Before describing the construction in detail it might be mentioned that the primary or inducing winding which is connected to the source of supply may be provided either on the stator or on the rotor, and in either event the winding referred to is connected to a commutator, or equivalent device which would have the function when associated with brushes or coöperating make and break devices, of progressively advancing or retarding the relation of the component parts of the winding with respect to the source. I prefer to employ for this purpose a commutator connected to the winding and brushes which are connected to the source and are rotated relative to the commutator at a speed which determines the speed of the motor.

In Fig. 1 I have shown a squirrel-cage rotor 10 which may be of usual construction and which is mounted on the motor shaft 11 supported in bearings in any desired manner. The stator 12 is provided with a primary or inducing winding 13, the type of which will be explained later. This winding is connected to the bars of a commutator 14 which is stationary in this case, and the bars of which are engaged by brushes 15 adapted to be rotated in numerous specifically different ways. In this instance the brushes 15 and collector rings 16 which supply current to part or all of the brushes, are mounted upon a common support 17 which is driven by the motor itself,— the commutator 14, brushes 15 and rings 16 being arranged concentrically with respect to the motor shaft 11. The ring and brush support 17 is in this case rotated through the instrumentality of a friction disk 18 fixed to one end of shaft 11 and engaged by a relatively small wheel 19 whose position relative to the disk 18 may be adjusted by any suitable means such as lever 20, and which, through gears 21, drives a shaft 22 connected by gears 23 to the support 17.

In Figs. 1, 2 and 3, for the sake of clearness, I have not attempted to show the bars of the commutator actually connected to the winding, as these connections are shown in the diagrammatic views.

It is quite immaterial whether the brushes, commutator and collector rings constitute a part of the motor or are in the form of a unit more or less distinct from the motor except for the electrical connections. The latter arrangement is illustrated in Fig. 2, where the commutator 14 and other parts associated therewith are mounted upon a support 27 separate from the base of the motor, the bars of the commutator being connected to the primary or inducing winding of the motor by connecting leads designated as a whole by the reference character 25. The brushes 15, rings 16 and support 17 are mounted upon a shaft 28 which is concentric with respect to the commutator 14 and is driven by a small variable speed motor 29 which may be a series motor and which is wholly separate and distinct from the main motor.

As before stated, the inducing winding or windings may be on the rotor instead of the stator, and this is shown in Fig. 3. The rotor 30 which is provided with the primary or inducing winding is mounted on a shaft 31 carrying a rotating commutator 14, the bars of which are engaged by the brushes 15, which, together with the collector rings 16 are mounted upon the support 17 arranged concentrically with the shaft 31 but rotatable with reference to the commutator and rotor as a whole. In this case the support 17, the brushes 15 and rings 16 are rotated through gearing 33 by a small variable speed motor 34 which in this case is mounted on a standard forming an integral part of the main motor base. The stator 35 is provided with a winding 36 which may be an ordinary squirrel-cage winding. However, whether the inducing winding or the winding which is connected to the main source of current is on the stator or on the rotor, the other winding which in Fig. 1 would be on the rotor and in Fig. 3 on the stator, might instead of being a squirrel-cage winding be an ordinary phase winding, or, in case the motor is of the synchronous type the winding would be provided on poles and would in that event be energized from a source of direct current.

Reference is now had to Figs. 4, 5 and 6 for an understanding of the preferred type of the primary or inducing winding and the manner of connecting the winding to the commutator and the relation of the connection between the commutator bars and brushes. I prefer to employ as a primary or inducing winding an alternating current open circuit winding 13, a diagram of which is shown in Fig. 4 for a four-pole motor. This winding, if considered as a three-phase alternating current winding, has in this instance three coils per pole per phase, the coils corresponding to each phase being connected from pole to pole in series, as shown. These coils may be connected in series or parallel, depending on the conditions or circumstances of particular cases. In this winding the coils corresponding to each phase are unconnected to the coils corresponding to each of the other phases, i. e., the coils for the three phases have no internal common connection or connecting point or points and the coils of each phase are subdivided in three groups, so that in effect the winding consists of three separate and distinct open circuit windings 13$^a$ for each phase, making the winding, as here shown, similar to a nine-phase winding. From the component parts of the winding, i. e., from the nine component circuits or windings I bring nine "starting" leads 13$^b$ and nine ending leads 13$^c$, these eighteen leads being connected to consecutive bars of the commutator 14 which is provided with the same number of bars as there are leads. The two leads 13$^b$ and 13$^c$ from the beginning and ending of each of the nine circuits or component windings are connected to bars of the commutator which are diametrically opposite or located 180 electrical degrees apart.

It will be seen that by connecting the leads in consecutive groups of three, beginning at any point, a regular three-phase winding will be obtained. This connection or grouping of the coils is accomplished by the brushes, which, as they are rotated relative to the commutator, successively alter the grouping, progressively transferring each winding from one group to the next succeeding group. In other words, externally of the machine the connections between the several component windings progress with the speed of rotation of the brushes and in this manner a progressive field is produced, the rate of rotation of which depends not only upon the character of the current, i. e., the cycles (assuming an alternating current is employed), but also upon the rate of rotation of the brushes and the progressive speed or rate of change of grouping the windings.

For three-phase current I employ six brushes which are spaced apart a distance slightly greater than the width of a commutator bar. Three of these brushes 15$^a$, consisting of alternate brushes 120 degrees apart, will be connected to the three collector rings 16 supplied from a source of three-phase current. The other three intermediate brushes 15ᵇ are utilized to connect together the component windings to form a star or delta connection. If these three brushes are connected together or shorted as in Fig. 4, the phase windings are star connected. If instead of connecting together or shorting the three alternately arranged brushes 15ᵇ the six brushes are connected in pairs or groups of two with consecutive brushes connected together, a delta connection is made.

It will be seen that if the brushes are stationary relatively to the commutator, and if they are so positioned on the commutator that each brush contacts three bars, the winding becomes an ordinary three-phase star or delta connected winding, depending upon how the brushes are grouped or connected. In this case the motor runs as an ordinary induction motor, if my invention is employed in a motor of that type, or as an ordinary synchronous motor if the invention is utilized in a motor of the latter type. It will be seen that when the brushes are stationary, regardless of how they bear on the bars, there are practically no local currents established because the individual circuits or component windings are connected in parallel and the entire winding becomes similar to the ordinary parallel wound alternating current stator winding.

If, on the other hand, the brushes are rotated relative to the commutator, the grouping of the coils is progressively changed. In other words, the phase connecting points are gradually advanced and this is done without at any time short-circuiting any part of the winding detrimentally. In this respect this winding has a very great advantage over closed or two-circuit direct current windings. The rate of rotation of the brushes relative to the commutator of course determines the resultant speed of the rotating member of the motor and the direction of rotation determines whether the speed is increased or decreased relative to normal speed.

The connections shown in Fig. 4 will be substantially the same for a polyphase alternating current supply system of any number of phases. In Fig. 6, for example, I have shown the connections for a two-phase system. In this case four brushes 15ᶜ are employed which will be electrically connected to the four leads of a two-phase supply system, opposite brushes being connected to the two leads of one phase. The brushes will be designed to span as much of the circumference of the commutator as possible, the spacing between brushes being in all cases slightly greater than the width of a bar of the commutator.

I wish it to be understood that although I have shown simply one form of the primary or inducing winding, the winding itself, i. e., the manner of connecting the coils from pole to pole and the connections between the commutator and the winding may be varied from the winding and the connections specifically shown and described herein, the particular form of the winding and the connections between the winding and the commutating device being in all cases varied to suit the requirements or exigencies of the case.

I wish it to be understood also that while I have shown one form of commutating device, the same consisting of an ordinary commutator engaged by brushes which are adapted to be rotated relative to the commutator, other forms of commutating devices may be employed, such for example as a contact or controller drum adapted to be engaged by contact fingers.

It will, therefore, be seen that other ways of carrying out the principle of my invention may be employed and I do not wish to be confined to any particular form, design or arrangement, except to the extent to which I am specifically limited in the appended claims.

Having thus described my invention, what I claim is:—

1. In an alternating current motor, a stator and a rotor, one of said elements having a primary or inducing winding comprising a plurality of open circuit component windings unconnected internally of said element, means for supplying a polyphase alternating current to said winding and for connecting the component windings thereof to form a polyphase alternating current winding by which a progressive or traveling field may be produced, said means comprising two sets of coöperating contact devices, the devices of one set being connected to the component windings, and devices of the other set being adapted to be connected to the source of current, and means for causing a relative movement between said devices whereby the phase grouping of the component windings is continually changed.

2. In an alternating current motor, a stator and a rotor, one of said elements having a primary or inducing winding comprising a plurality of open circuit component windings unconnected internally of said element, means for supplying a polyphase alternating current to said windings and for connecting the component windings to form a polyphase alternating current winding by which a progressive or traveling field may be produced, said means comprising two sets of contact devices, one set of devices consisting of commutator segments connected to the component windings, and the other set consisting of brushes engaging the commutator, and means for causing a relative movement between said devices whereby the phase grouping of the component windings is continually changed.

3. In an alternating current motor, a stator and a rotor, one of said elements having a primary or inducing winding comprising a plurality of open circuit component windings unconnected internally of said element, means for supplying a polyphase alternating current to said windings and for connecting the component windings to form a polyphase alternating current winding having a number of coils per phase and by which a progressive or traveling field may be produced, said means comprising two sets of contact devices, the devices of one set being connected to the component windings, and devices of the other set being adapted to be connected to the source of current, and means for causing a relative movement between said devices whereby the phase grouping of the component windings is continually changed.

4. In a three phase alternating current motor, a stator and a rotor, one of said elements having a plurality of independent or open circuit windings adapted to be connected externally in groups to form a three phase winding, means for grouping the open circuit windings and for supplying current thereto comprising a commutator to which the leads of said windings are connected and six brushes engaging the commutator and serving through the commutator to group said windings into a three phase winding and to supply a three phase current thereto, and means for causing the brushes and commutator to be relatively and continuously rotated to continuously change the phase groupings of the said windings.

In testimony whereof, I hereunto affix my signature.

WILLIS W. HALE.